(12) United States Patent
Wolff et al.

(10) Patent No.: US 10,351,119 B2
(45) Date of Patent: Jul. 16, 2019

(54) AUTOMATED PARKING BRAKE AND METHOD FOR OPERATING AN AUTOMATED PARKING BRAKE

(71) Applicant: Robert Bosch GmbH, Stuttgart (DE)

(72) Inventors: Helmut Wolff, Untergruppenbach (DE); Andreas Englert, Untergruppenbach (DE); Tobias Putzer, Bad Friedrichshall (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 15/574,544

(22) PCT Filed: May 20, 2016

(86) PCT No.: PCT/EP2016/061421
§ 371 (c)(1),
(2) Date: Nov. 16, 2017

(87) PCT Pub. No.: WO2016/188899
PCT Pub. Date: Dec. 1, 2016

(65) Prior Publication Data
US 2018/0154880 A1    Jun. 7, 2018

(30) Foreign Application Priority Data

May 22, 2015 (DE) .......... 10 2015 209 480
Apr. 11, 2016 (DE) .......... 10 2016 205 985
May 19, 2016 (DE) .......... 10 2016 208 583

(51) Int. Cl.
*B60T 13/74* (2006.01)
*B60T 7/12* (2006.01)
(Continued)

(52) U.S. Cl.
CPC ............ *B60T 13/746* (2013.01); *B60T 7/107* (2013.01); *B60T 7/12* (2013.01); *B60T 13/145* (2013.01);
(Continued)

(58) Field of Classification Search
CPC ...... B60T 13/746; B60T 13/12; B60T 13/741; B60T 13/588
See application file for complete search history.

(56) References Cited

U.S. PATENT DOCUMENTS

2002/0027387 A1* 3/2002 Kubota ............... B60T 13/741
303/20
2005/0194836 A1    9/2005 Simpson et al.
(Continued)

FOREIGN PATENT DOCUMENTS

CN        103373337 A       10/2013
DE   10 2014 220 252 A1     4/2016
(Continued)

OTHER PUBLICATIONS

International Search Report corresponding to PCT Application No. PCT/EP2016/061421, dated Sep. 13, 2016 (German and English language document) (5 pages).

*Primary Examiner* — Vishal R Sahni
(74) *Attorney, Agent, or Firm* — Maginot, Moore & Beck LLP

(57) ABSTRACT

An automated parking brake for a motor vehicle having at least one brake device is configured to adopt at least two states. In a first state, no clamping force is established by the parking brake, and in a second state, a clamping force is established by the parking brake. A transition point defines a transition between the two states. An identification of the transition point is carried out during a releasing process of the parking brake.

12 Claims, 5 Drawing Sheets

(51) Int. Cl.
*B60T 13/58* (2006.01)
*B60T 13/14* (2006.01)
*B60T 7/10* (2006.01)

(52) U.S. Cl.
CPC .......... *B60T 13/588* (2013.01); *B60T 13/741* (2013.01); *B60T 2201/06* (2013.01); *B60T 2201/10* (2013.01)

(56) References Cited

U.S. PATENT DOCUMENTS

| | | |
|---|---|---|
| 2010/0262329 A1 | 10/2010 | Monti et al. |
| 2010/0308645 A1* | 12/2010 | Maron .................. B60T 13/588 303/20 |
| 2014/0214296 A1* | 7/2014 | Baehrle-Miller ..... B60T 11/046 701/70 |
| 2017/0297548 A1* | 10/2017 | Baehrle-Miller ......... B60T 7/04 |

FOREIGN PATENT DOCUMENTS

| | | |
|---|---|---|
| JP | 11-236931 A | 8/1999 |
| JP | 2000-283198 A | 10/2000 |
| JP | 2001-225741 A | 8/2001 |
| JP | 2008-133922 A | 6/2008 |
| JP | 2014-213721 A | 11/2014 |

* cited by examiner

AUTOMATED PARKING BRAKE AND METHOD FOR OPERATING AN AUTOMATED PARKING BRAKE

This application is a 35 U.S.C. § 371 National Stage Application of PCT/EP2016/061421, filed on May 20, 2016, which claims the benefit of priority to the following Serial No. DE 10 2015 209 480.4, filed on May 22, 2015 in Germany, Serial No. DE 10 2016 205 985.8, filed on Apr. 11, 2016 in Germany, and Serial No. DE 10 2016 208 583.2, filed on May 19, 2016 in Germany the disclosures of which are incorporated herein by reference in their entirety.

The present disclosure concerns a method for operating an automated parking brake for a motor vehicle with at least one brake device, wherein the parking brake can adopt at least two states, wherein no clamping force is established by means of the parking brake in a first state, and a clamping force is established by means of the parking brake in a second state, wherein a transition point defines the transition between the two states, characterized in that the identification of the transition point is carried out during a parking brake releasing process.

BACKGROUND

From the prior art, for example the patent application DE 2014 102 202 52 A1 is known. Said document concerns a method for carrying out a parking brake process in a motor vehicle with an automated parking brake, wherein the parking brake process comprises at least two phases, wherein in a first upstream phase no clamping force is established by the parking brake, and in a second downstream phase a clamping force is established by the parking brake, wherein the parking brake comprises an actuatable parking brake actuator for producing the clamping force, characterized in that the detection of a transition from the first phase to the second phase is carried out based on a time profile of a specific parameter of the actuation of the parking brake actuator. In this case, the determination of the transition from a zero-force phase to a force establishment phase is also carried out during a parking brake engagement process.

New requirements are placed on the parking brake by functions such as highly automated parking (the driver is not sitting in the vehicle). In the event of a malfunction of the hydraulic brake device (for example of the ESP), the parking brake acts as the necessary (for safety reasons) fallback level. Investigations have revealed that to meet the safety-related requirements in this case an actuation time of 200 milliseconds is necessary. Said value can however vary in the range of 100 ms≥t≤700 ms because of altered requirements. The actuation time means in this case the time that elapses when the actuator is energized until ultimately the establishment of a clamping force takes place. However, this is not currently possible, or is only possible at great technical cost, with the solutions that are customary in the market.

SUMMARY

By means of the method according to the disclosure, with certain assumptions the requirements for an actuation time of ≤200 milliseconds can be achieved in the case of highly automated parking/driving. Advantageously, the method according to the disclosure enables the determination of a transition between a force reduction phase and a zero-force phase during a parking brake releasing process for this purpose. This enables the demanded rapid availability of the parking brake to be guaranteed. This also increases safety. Likewise, small differences of the transition point between the engagement process and the releasing process can occur. The method according to the disclosure therefore also enables higher accuracy, for example in the case of positioning the parking brake during a releasing process. This is enabled according to the disclosure. Further embodiments of the disclosure are the subject matter of subordinate claims.

The method according to the disclosure for operating an automated parking brake for a motor vehicle with at least one brake device, wherein the parking brake can adopt at least two states, wherein in a first state no clamping force is established by means of the parking brake, and in a second state a clamping force is established by means of the parking brake, wherein a transition point defines the transition between the two states, is characterized in that the identification of the transition point is carried out during a parking brake releasing process.

It should be understood that a parking brake comprises an engagement process (for establishing a braking or clamping force) and a releasing process (for reducing a braking or clamping force). The parking brake switches the two states "no clamping force established" and "clamping force established" here. According to the disclosure, the transition point between said two states is determined during the parking brake releasing process. Alternatively, the transition point can also be considered to be the phase transition "free travel transition" and "establishment/reduction of clamping force". The definition of the transition point can for example be carried out in relation to the brake piston (such as for example the relative or absolute position thereof or the displacement thereof from the starting point) or in relation to a different variable (such as the angle of rotation of the spindle or of the actuator).

The determination of the transition point during the releasing process gives a number of advantages, in particular in comparison with the determination of the transition during the engagement process. The safety of the system can be increased by a determination during the releasing process. For example, it is possible thereby to directly check whether the releasing process is actually functioning and the available clamping force is established. Likewise, there are situations and applications in which the knowledge of the transition point during a releasing process is advantageous. In such a case, by the determination of the transition point during releasing, a determination of the transition point during releasing and a medium-term storage of the value that would be necessary to be able to call up the determined value during the releasing process could be dispensed with. Furthermore, by an additional determination during engagement (i.e. determination both during the releasing process and also during the engagement process), small differences in comparison with the transition point determined during engagement are identified and suitably taken into account. This enables both a more accurate result and also monitoring of an achieved result.

In an advantageous embodiment, the method is characterized in that the identification of the transition point is carried out based on a time profile of a variable representing the clamping force of the parking brake.

It should be understood that a variable is defined, using which the braking force and/or clamping force applied by means of the parking brake can be estimated. Such a variable can for example be a higher-level variable, such as the motor torque of a parking brake actuator that is implemented as an electric motor. Advantageously, the selected variable is simple and safe to check. The method thus detects a variable representing the clamping force and evaluates the profile thereof. A profile is determined by the consideration of a value that varies over time. By the evaluation of the profile, advantageously a higher level of certainty and quality of the result can be achieved. As a result of this, for example an extrapolation based on previous values is also possible, in order to obtain indications regarding future developments for example. Likewise, an interpolation between previous values can be carried out, in order to identify and neutralize "outliers", for example.

In a possible embodiment, the method is characterized in that the identification of the transition point is suspended during a switch-on phase.

It should be understood that the entire releasing process is not taken into account during the determination of the transition point. For example, it is possible that sizes of a certain interval that is measured during the method are not taken into account during the determination of the transition point. Alternatively, suspension of the measurement of the variable is also conceivable. A parking brake releasing process is divided for example into the phases: switch-on phase, force reduction phase, transition phase and free travel phase. Advantageously, in this case the switch-on phase of the parking brake actuator is hidden. The switch-on phase of an electric motor is for example characterized by a switch-on peak in terms of the current values. However, this can result in an error in the evaluation. Therefore, advantageously the values measured during the switch-on peak are not taken into account during the evaluation, or no measurement is carried out during the switch-on phase. This can for example be enabled by means of a time factor. In this case for example, measurement values of the first 10 milliseconds of the switch-on process are not taken into account. Advantageously, this results in increased quality of the result and increased certainty during the identification of the transition point.

In a preferred embodiment, the method is characterized in that the identification of the transition point is started if the variable representing the clamping force of the parking brake lies below a defined threshold value.

It should be understood that the entire releasing process is not taken into account during the determination of the transition point. In particular, the values of variables measured during the method are only taken into account during the determination of the transition point if they meet a certain condition. Such a condition can be a quantitative factor, so that no measurement values that lie above a defined level are taken into account. The identification of the transition point is thus advantageously only started if the profile of the values of the variable representing the clamping force lies below a defined threshold value. This enables a switch-on peak as described above to be excluded. Furthermore, this enables a simple restriction, which nevertheless provides a high level of certainty.

The condition for a start of the process for the identification of the transition point, in the case of a suppression of the switch-on phase, is thus as follows for example:

$$i(t) < i(\text{limit value}) \qquad \text{Condition 1:}$$

Thus, the identification only starts if the switch-on peak has decayed and/or the greatest part of the clamping force has decreased.

In an advantageous embodiment, the method is characterized in that during the identification of the transition point it is determined whether there is a continuous decline in a profile of values of the variable representing the clamping force of the parking brake, wherein a continuous decline is identified if a plurality of, in particular 3 or 4, decreasing, directly chronologically sequential values are determined.

It should be understood that for the determination of the transition point an analysis is carried out as to whether there is a specific decline of the measured variable, for example of the current value. A specific decline can be defined such that the profile is a continuous decline. Such a profile is for example assumed if a number of measured values of variables comprises a decreasing level. A number can for example be considered as 4 measured values with reducing values of variables. By the use of a plurality of values, the reliability of the evaluation can be increased. Wherein by the use of the aforementioned 4 measured values, however, rapid identification with sufficiently high reliability is enabled at the same time. A continuous decline is assumed to be reliable, i.e. the estimation is seen as robust, if the current decreases continuously at a plurality of successive points, in particular at least four. If a measurement is carried out every 5 milliseconds, advantageously a change of the current value profile can be identified in a period of 20 milliseconds with a high level of reliability for a valid identification.

This means that the current must for example decline continuously for at least 4 successive points, so that a decrease in force is reliably present. The condition for a continuous decline is therefore for example as follows.

$$i(k) < i(k-1) < i(k-2) < i(k-3) \qquad \text{Condition 2}$$

Furthermore, it is advantageously conceivable that a transition point can be directly concluded in the case of a defined number of measured reducing values of variables.

This enables the rapid and simple estimation of the end of the force reduction phase, or estimation of the transition point.

In an alternative development, the method is characterized in that the transition point is identified if a change in a profile of values of the variable representing the clamping force of the parking brake is determined.

It should be understood that the analysis of the profile of values is in particular aimed at identifying a specific characteristic of the profile of values. If such a previously defined characteristic is found in the profile of values, a transition point is concluded. Such a characteristic can in particular lie in a change of the profile of values. For example, a transition from the force reduction phase to the free travel phase can be defined if an "inflection" is identified in the clamping force profile.

In a preferred embodiment, the method is characterized in that the transition point is identified if a decreasing decline in a profile of values of the variable representing the clamping force of the parking brake is determined, wherein a decreasing decline is identified if a plurality of, in particular 3, reducing difference amounts (d1, d2, d3) of chronologically immediately successive values are determined, and/or if a plurality of, in particular 3, difference amounts (d1, d2, d3) of the chronologically immediately successive values is each lower than a threshold value (a, b, c) associated with the respective difference amounts (d1, d2, d3), wherein in particular the threshold values (a, b, c) are equal or there is a reduction of the threshold values (a, b, c) according to the chronological ranking of the associated difference amounts (d1, d2, d3).

It should be understood that a transition from the force reduction phase to the free travel phase is concluded if a leveling decrease in the force is detected. A leveling decrease in the force, also known as a decaying decrease in the force, is identified if a plurality of, in particular 3, reducing difference amounts—the chronologically immediately successive current values of actuation of the parking brake actuator—are determined. Difference amounts are defined as follows:

$$d1=i(k-3)-i(k-2);$$

$$d2=i(k-2)-i(k-1);$$

$$d3=i(k-1)-i(k)$$

The condition as described above can be formulated as follows:

$$d1>d2>d3 \qquad \text{Condition 3}$$

In an alternative embodiment, a leveling decrease in force is identified if a plurality of, in particular 3, difference amounts—the chronologically immediately successive current values of an actuation of the parking brake actuator—each lies below a threshold value associated with the difference amounts, wherein the threshold values are equal or there is a continuous decline of the threshold values according to the chronological ranking of the associated difference amounts.

$$d1<a \text{ AND } d2<b \text{ AND } d3<c \text{ with } a>=b>=c \qquad \text{Condition 4}$$

Wherein "=" shall mean a linear decline in the force or in the current and ">" shall mean a progressive decline in the force or in the current.

Typical values of the threshold values a, b, c for a change in current are:
a=0.3 to 1 A
b=0.2 to 1 A
c=0.1 to 1 A The elements a, b, c shall be understood to be threshold values here that can be adapted to the existing brake system or the respective component behavior. The following relationship applies to the selection of the parameters: the smaller the values of a, b, c the more sensitive is the identification; the smaller the values of a, b, c the more susceptible is the identification to disturbances.

Of course, it can also be provided that a transition point is identified if a continuous and leveling decline of the current values is determined. This means that a transition is for example only identified if both the conditions 1 and 2 and also condition 3 or/and condition 4 are met.

In an advantageous embodiment, the method is characterized in that the time profile of the variable representing the clamping force of the parking brake is evaluated during a force reduction phase for identification of the transition point.

It should be understood that for the determination of the transition point the profile of the values of the variable is analyzed during the force reduction phase of the parking brake. This enables timely identification of the transition point. Once the determined parameters indicate that the set conditions that define a transition are met, the phase is no longer defined as a force reduction phase but as a transition phase. The transition phase is thus positioned between the force reduction phase and the free travel phase. Furthermore, it is short in terms of time in comparison with the other phases. The designation as a transition "phase" is used because a transition between a decrease in force and free travel is in fact often not point by point at a point in time, but can only be determined approximately in time (i.e. "indistinctly") over a time interval.

One possible embodiment of the method is characterized in that a current value of a parking brake actuator and/or
a voltage of a parking brake actuator and/or
a motor angular rate of a parking brake actuator is taken into account during the determination of the variable representing the clamping force of the parking brake.

It should be understood that measurable variables such as the current value, voltage and/or motor angular rates of an actuator are suitable for use as a variable representing the clamping force of the parking brake. Of course, a plurality of variables can also be taken into account in order to form the variable representing the clamping force. Advantageously, the validity can be increased by the measurability of the variables. Furthermore, advantageously in this case it is a variable that is already analyzed in the system. This enables additional cost to be avoided or reduced. Besides taking into account the measured values directly, a time derivative of the profile of values can also be advantageously carried out and taken into account for example.

In a preferred development, the method is characterized in that the determined transition point is taken into account during operation of the parking brake, in particular as a reference value.

It should be understood that the knowledge about the transition point is used during further operation of the parking brake. This advantageously enables the operation of the parking brake to be adapted thereto. For example, the identified position of the transition between the force reduction phase and the free travel can be stored and the control of the parking brake can be adapted thereto.

In a possible embodiment, the method is characterized in that the following is carried out while taking into account the determined transition point:
positioning the parking brake, and/or
positioning the parking brake directly from the force reduction phase of the parking brake and/or
positioning the parking brake directly from an end point of the parking brake and/or
positioning the parking brake in a free travel phase and/or
positioning the parking brake at a braking starting point, wherein in particular a reduced free travel of the parking brake is set, wherein in particular the reduced free travel is reduced compared to normal free travel.

It should be understood that the position of the determined transition point can be used for a number of operations of the parking brake. In this case, positioning of the parking brake is mentioned. The positioning can for example relate to setting, i.e. approaching, the parking brake to a braking starting point, an initial point or other points. Advantageously, improved accuracy can be achieved during this through the knowledge of the transition point.

Furthermore, positioning of the parking brake can be directly from an arbitrary point of the force reduction phase. For example, the positioning can be carried out directly from the engaged position (i.e. from the end point) of the parking brake. This increases the speed at which the desired position is achieved and thereby improves the ability to use the parking brake. This also yields a safety gain, because the parking brake is more rapidly available and can be called upon for a further activation, for example for the establishment of a clamping force.

Furthermore, positioning of the parking brake in a free travel position is possible. The positioning is thus carried out in a released position of the parking brake in which a defined free travel is set. This should be understood for example as the positioning of the parking brake at the braking starting point starting from an end point. This means that the parking brake does not have to carry out a releasing process fully to the starting point in order to then position the parking brake at the braking starting point. Using the knowledge of the transition point, the parking brake can be directly positioned at the braking starting point. This is a significant saving in time and thereby a gain in safety, because faster activation of the parking brake is possible.

According to the disclosure, a control unit for operating an automated parking brake for a motor vehicle is provided, wherein the parking brake can adopt at least two states, wherein in a first state no clamping force is established by means of the parking brake, and in a second state a clamping force is established by means of the parking brake, wherein a transition point of the transition between the states is defined, characterized in that the control unit comprises means for identifying and is designed to identify a transition point during a parking brake releasing process.

It should be understood that a control unit and/or another computing unit for the motor vehicle is provided that is configured to, i.e. is designed to and/or comprises means to, carry out or support a method—as previously described.

According to the disclosure, furthermore an automated parking brake for a motor vehicle is provided, wherein the parking brake can adopt at least two states, wherein in a first state no clamping force is established by means of the parking brake, and in a second state a clamping force is established by means of the parking brake, wherein a transition point of the transition between the states is defined, characterized in that the parking brake comprises means for identifying and is designed to identify a transition point during a parking brake releasing process.

It should be understood that a parking brake for the motor vehicle is provided that is configured to, i.e. is designed to and/or comprises means to, carry out or support a method—as previously described.

BRIEF DESCRIPTION OF THE DRAWINGS

It should be noted that the features mentioned individually in the description can be combined with each other in any technically meaningful manner and reveal further embodiments of the disclosure. Further features and functionality of the disclosure arise from the description of exemplary embodiments using the accompanying figures.

In the figures.

DETAILED DESCRIPTION

Figure 1:
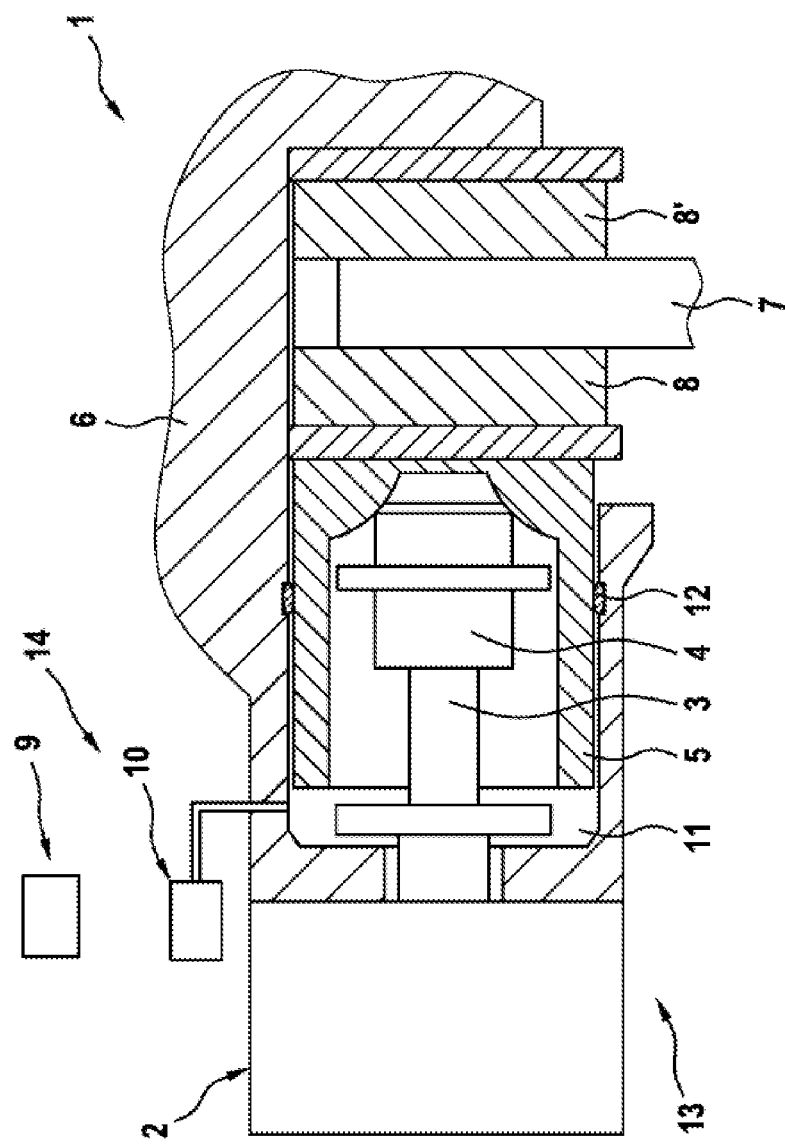
FIG. 1 shows a schematic sectional view of a brake device with an automated parking brake in a "motor on caliper" design.

FIG. 1 shows a schematic sectional view of a brake device 1 for a vehicle. In this case, the brake device 1 comprises an automated parking brake 13 (also known as an automatic parking brake or automated parking brake, in short APB), which can exert a clamping force to hold the vehicle by means of an actuator 2 (electric motor). The actuator 2 of the illustrated electromechanical parking brake 13 drives a spindle 3 that is supported in an axial direction for this, in particular a threaded spindle 3. On the end of the spindle 3 facing away from the actuator 2, the spindle 3 is provided with a spindle nut 4 that contacts the brake piston 5 when the automated parking brake 13 is in the clamped state. In this way, the parking brake 13 electromechanically transfers a force to the brake linings 8, 8' or the brake disk 7. In this case, the spindle contacts an inner end face of the brake piston 5 (also known as the rear of the base of the brake piston or inner piston floor). The spindle nut 4 is displaced in the axial direction during a rotary motion of the actuator 2 and a resulting rotary motion of the spindle 3. The spindle nut 4 and the brake piston 5 are supported in a brake caliper 6 that overlaps a brake disk 7 in the manner of a claw.

A respective brake lining 8, 8' is disposed on both sides of the brake disk 7. In the case of a clamping process of the brake device 1 by means of the automated parking brake 13, the electric motor (actuator 2) rotates, whereupon the spindle nut 4 and the brake piston 5 are moved in the axial direction towards the brake disk 7 in order to thereby produce a predetermined clamping force between the brake linings 8, 8' and the brake disk 7. Because of the spindle drive and the self-locking connected thereto, a force produced with the parking brake 13 by means of the actuation of the electric motor is also maintained at the end of the actuation.

The automated parking brake 13 as represented is for example implemented as a "motor on caliper" system and is combined with the service brake 14. The parking brake 13 could also be considered as being integrated within the system of the service brake 14. Both the automated parking brake 13 and the service brake 14 act on the same brake piston 5 and the same brake caliper 6 in order to establish a braking force on the brake disk 7. However, the service brake 14 comprises a separate actuator 10, for example a foot-operated brake pedal with a brake force booster. The service brake 14 is configured in FIG. 1 as a hydraulic system, wherein the actuator 10 is boosted by the ESP pump or an electromechanical brake force booster (for example a Bosch iBooster) or can be implemented by the same. Further embodiments of the actuator 10 are also conceivable, for example in the form of a so-called IPB (Integrated Power Brake), which in principle constitutes a brake-by-wire system, in which a plunger is used to establish a hydraulic pressure. In the case of service braking, a predetermined clamping force is established hydraulically between the brake linings 8, 8' and the brake disk 7. To establish a braking force by means of the hydraulic service brake 14, a medium 11, in particular an essentially incompressible brake fluid 11, is compressed in a fluid chamber bounded by the brake piston 5 and the brake caliper 6. The brake piston 5 is sealed with respect to the surroundings by means of a piston sealing ring 12.

The actuation of the brake actuators 2 and 10 is carried out by means of one or a plurality of end stages, i.e. by means of a control unit 9, which for example can be a control unit of a driving dynamics system, such as an ESP (electronic stability program) or another control unit.

In the case of actuation of the automated parking brake 13, first the free travel or the air gap must be overcome before a braking force can be established. The distance that the spindle nut 4 must overcome during the rotation of the spindle 3 in order to come into contact with the brake piston 5 is referred to as free travel for example. The distance between the brake linings 8, 8' and the brake disk 7 in disk brake systems of motor vehicles is referred to as an air gap. As a rule, said process lasts a relatively long time in relation to the overall actuation, in particular for the automated parking brake 13. At the end of such a preparation phase, the brake linings 8, 8' are in contact with the brake disk 7 and the establishment of force starts in the case of a further actuation. FIG. 1 shows the state with the free travel and air gap already overcome. In this case, the brake linings 8, 8' are in contact with the brake disk 7 and all brakes, i.e. the parking brake 13 and also the service brake 14, can immediately establish a braking force on the corresponding wheel in the event of a subsequent actuation. The descriptions for an air gap also apply in a similar manner to the service brake 14, wherein however, owing to the highly dynamic pressure establishment, overcoming the free travel requires less time than with the parking brake 13.

Figure 2:
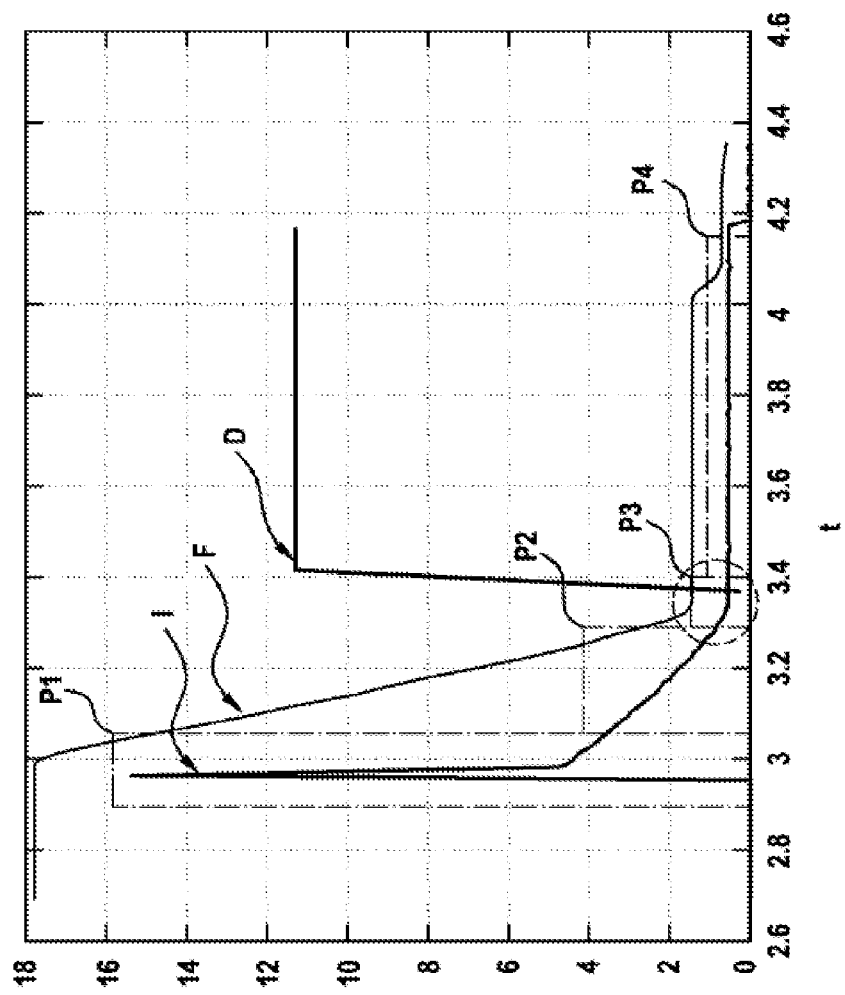
FIG. 2 shows a characteristic current and a clamping force profile for a releasing process.

The described method can be used for the identification of the transition point of the current signals of the motor-gearbox unit of the automatic parking brake 13 sampled in the control unit 9. FIG. 2 shows an exemplary motor current profile I and a force profile F of the parking brake against time t for an automated parking brake 13 releasing process. The force F shall mean the clamping force applied to the wheel brake, which is achieved by means of the parking brake 13 in the engaged state. Likewise, the current profile I is shown, which is available here on the control unit sampled in a 10 ms pattern. The graph D that is shown shows the detection of the transition point from the establishment of clamping force to the free travel by means of a detection signal. If the transition point has been detected, the signal jumps to the value 10.

The releasing process represented starts from the engaged state of the parking brake 13. In this case, there is a high clamping force F. Because the parking brake 13 is self-locking, no motor current I is necessary for this. In the switch-on phase P1, the actuator 2 is energized in the releasing direction for the first time and the parking brake actuator, i.e. the spindle nut 4 that is driven by the spindle 3 by means of the actuator 1 of the parking brake 13, is activated. Owing to the activation of the actuator 2, a high point-to-point current value I (also known as a "switch-on peak") results. Initially, however, the algorithm for identification of the transition point according to the condition 1 is inhibited. If this were not the case, then the algorithm could construe the transition of the switch-on peak in the force reduction phase P2 (at about 3 seconds) as an inflection in the releasing process.

Subsequently, the clamping force F between the spindle nut 4 and the brake linings 8, 8', or between the brake linings 8, 8' and the brake disk 7, is reduced by the movement of the parking brake 13 in the releasing direction. A reduction also appears in the current value I in the force reduction phase P2, which corresponds to a reduction of the clamping force. During the force reduction phase P2, the current profile I is approximately linear. That means the condition 2 of a continuous decrease is met, but not the condition 3 of reducing reduction. Therefore, no identification of a transition point is carried out, in accordance with the illustrated embodiment.

In the transition phase P3, the transition from the clamping force reduction phase P2 to the free travel phase P4 is carried out. In this case, the illustrated "inflection" of the current profile I can be identified very accurately, i.e. identification of the transition point from the establishment of the clamping force to the free travel. In principle, it should be mentioned that there is no unique fixed point for said inflection. The inflection can, as can be seen in FIG. 2, rather be detected in a specific time window. I.e. the inflection can only be detected over a period. The subsequent phase P4 describes the free travel phase, in which the spindle nut 4 establishes the necessary free travel for a brake device 1 that is free of residual braking torque.

Figure 3:
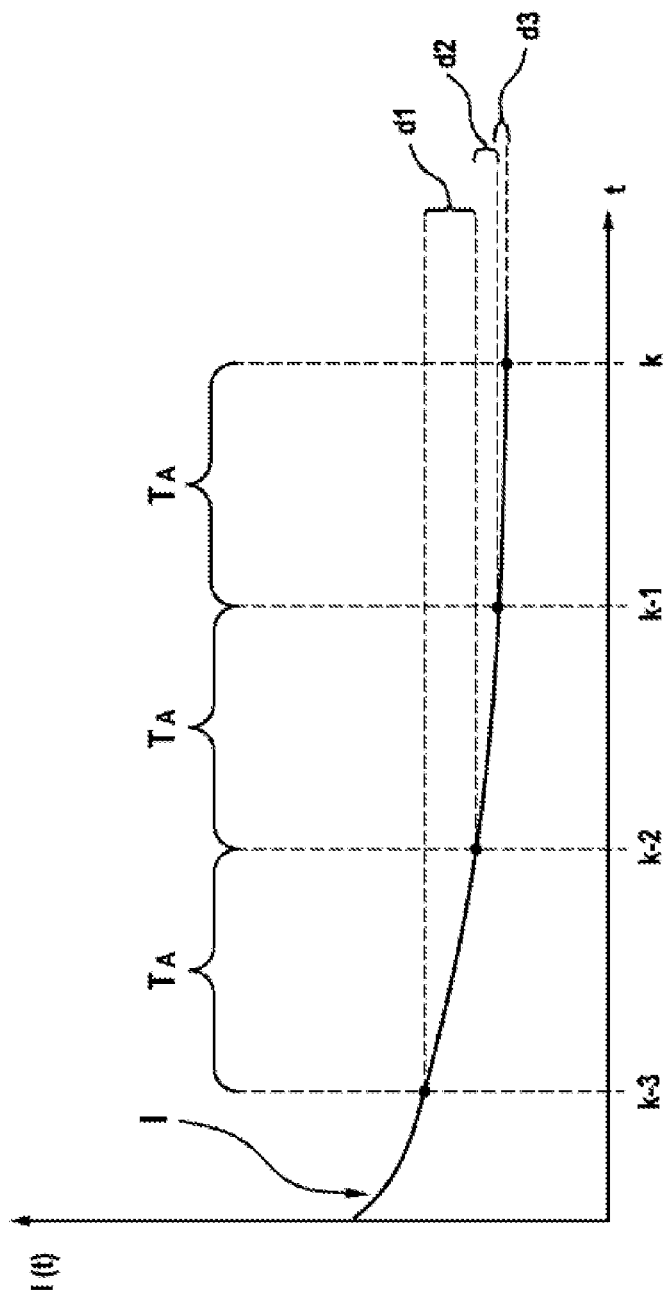
FIG. 3 shows an idealized profile of a motor current against time for a decline of the motor current and the proximity relationships of the measurement points.

FIG. 3 shows a current profile I against time t, such as arises for example by a reduction of a clamping force F by means of an actuator 2 of the parking brake 13 that is implemented as an electric motor. The current profile I is schematically represented in an idealistic manner.

Furthermore, in this case the measurement points k-3, k-2, k-1, k are shown. Said data points are now the present digital data points of the motor current signal itself. The measurement of the data points is carried out in each case with an equidistant time interval TA between the measurement points k-3, k-2, k-1, k. The current signals are available sampled in a certain time pattern (here by way of example 10 ms). Moreover, FIG. 3 illustrates the difference d between two adjacent measurement points of the current values I. The current value differences d1, d2, d3 are shown for this. The very accurate identification of the transition point uses an evaluation of the proximity relationships between the measured and digital data points of the motor current in the releasing process that are present in the control unit.

For example, a change in current value is identified if a continuous decline in the underlying measurement variables, i.e. the current values I, is determined. For example, continuity is identified if a plurality of decreasing measurement variables, for example 4, are determined. FIG. 3 depicts the representation of a decreasing current profile I against time t. Furthermore, it is represented against the Y-axis that the decline in the current values comprises a flattening profile, i.e. there is a decaying motor current signal. This can be seen from the fact that d1 is greater than d2, and in turn d2 is greater than d3. This can be considered as an indication of a decaying decline in the measurement values. This is in turn an indication of a transition from a force reduction phase to free travel.

Figure 4:
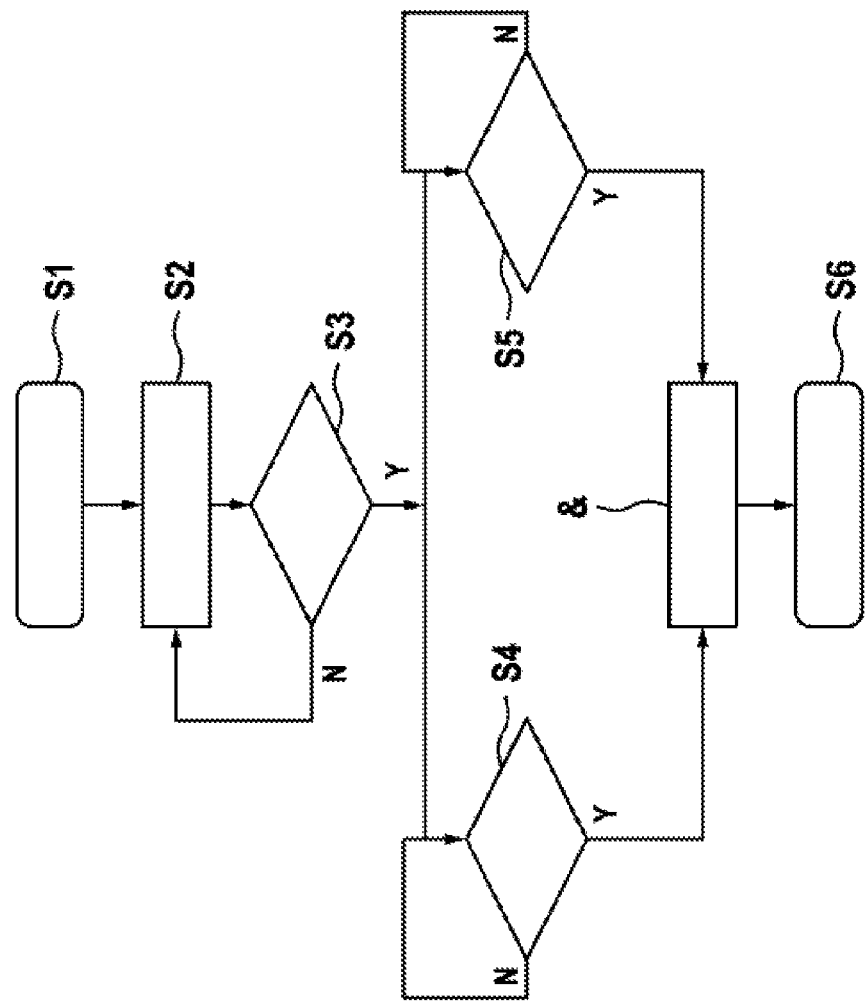
FIG. 4 shows a flow chart of an example of the identification of the transition point.

FIG. 4 shows a flow chart of an exemplary identification of the transition point between the force reduction phase and the free travel phase. The method starts from a clamped state of the parking brake 13, in which the brake piston takes up the end position thereof (see $x_E$ in FIG. 5). In the first step S1, the releasing process is started. The brake piston is displaced by actuation of the actuator 2 towards a zero-braking torque initial position (see $x_A$ in FIG. 5). The engaged parking brake 13 is released during this, whereby a reduction in the clamping force occurs (see F in FIG. 2). In a further step S2, in this case the current signal I of the actuator 2 is sampled (this may be seen in FIG. 3). This step is implemented until the termination of the method. In a step S3, an analysis is carried out as to whether the current signal I meets a first condition. As a first condition, for example it is set that the current signal I lies below a certain value in order to exclude a switch-on peak from the analysis for example. If the condition 1 is not met (S3=N), furthermore a sampling and analysis of the current values I is carried out. If the condition 1 is met (S3=Y), in a next step S4 an analysis is carried out as to whether the current signal I meets a second condition. As a second condition, it is defined that the current signal I shows a continuous decline, for example that four successively decreasing measurement values were determined. If the second condition is not met (S4=N), the analysis is continued until the method is terminated or the condition is met (S4=Y). Furthermore, after meeting the condition 1 (S3=Y), in a further step S5 an analysis is carried out as to whether the current signal I meets a third condition. As a third condition, it is defined that the current signal I shows a decaying decline, for example that there are three reducing difference amounts (see for example d1, d2, d3 in FIG. 3) between the four successively decreasing measurement values. If the third condition is not met (S5=N), the analysis is continued until the method is terminated or the condition is met (S5=Y). If the second condition (S4=Y) and the third condition (S5=Y) are met (&), the transition point at said point is defined in step S6. Alternatively, it is also conceivable that a sequential check of the conditions takes place, i.e. the condition 3 is only checked if the condition 2 has been met. Likewise, it is conceivable that only one of the two conditions 2 or 3 is checked and the transition point is defined at the point at which the one condition is met in addition to condition 1.

Figure 5:
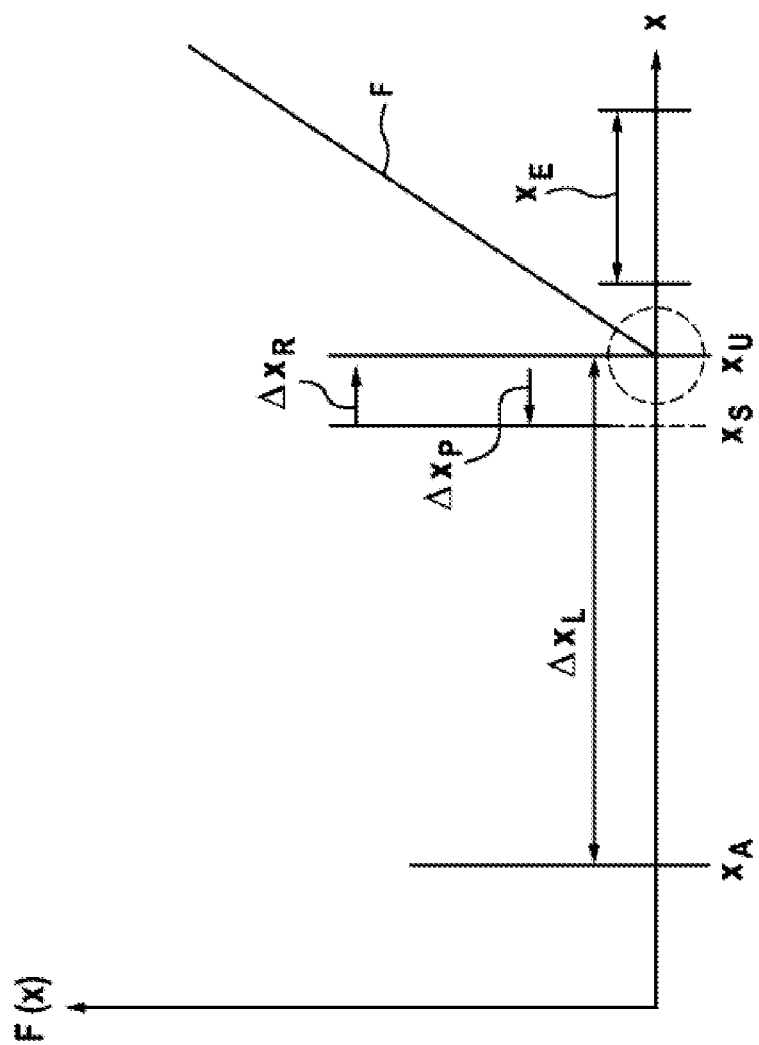
FIG. 5 shows the positioning of the parking brake according to a releasing process and a distance-dependent profile of the electromechanical clamping force.

FIG. 5 shows positioning of the parking brake 13 after or during a releasing process. Furthermore, a distance-dependent profile of the clamping force F is shown that is produced during actuation of the brake actuator 2 of the parking brake 13. Because the parking brake 13 can also be used in order to enable deceleration of the vehicle, the term braking force is used synonymously, which shall describe the braking force applied by the parking brake 13. The braking or clamping force F produced during actuation of the actuator 2 during an engagement process initially lies at the value 0, starting from an initial position $x_A$, and increases linearly after reaching the transition point $x_U$. The transition point defines the transition from the free travel phase to the establishment of force, or from the force reduction phase to the free travel phase. At the transition point $x_U$, the brake piston 5 or the brake lining 8, 8' on the brake piston 5 is in contact with the brake disk 7 for the first time, or for the last time. The transition point $x_U$ of the parking brake can therefore also be referred to as the brake contact point. The initial position $X_A$ of the brake piston 5 of the parking brake 13 characterizes a zero-braking torque initial state, i.e. a disengaged position of the parking brake 13. The distance traversed between the initial position $x_A$ and the transition point $x_U$ is referred to as free travel $\Delta x_L$. With the application of a braking force or clamping force F during a braking process or a clamping process, the brake piston reaches an end position $x_E$ that is located after the transition point $x_U$ and the accurate position of which depends on the level of the braking force or clamping force F applied. The end position $x_E$ thus describes an engaged position of the parking brake 13.

If the clamped parking brake 13 is released by actuating the actuator 2 so that the brake piston 5 is moved by means of the spindle nut 4 towards the initial position $x_A$, the clamping force F decreases until reaching the transition point $x_U$ and then remains at the zero level during the further travel (free travel). The transition of the clamping force F from the decrease in force to the zero level at the transition point $x_U$ can be determined using the inflected profile of an electromotive state variable of the actuator 2, in particular using the motor current I, possibly also using the motor speed.

Using an exemplary embodiment of the method, by means of a positioning process the parking brake 13 can be positioned at a braking starting point $x_S$ that lies between the zero-braking torque initial position $x_A$ and the transition point $x_U$. The braking starting point $x_S$ is still located within the free travel $\Delta x_L$, but at a short distance from the transition point $x_U$. If the spindle nut 4 or the brake piston 5 takes up the position at the braking starting point $x_S$, then the remaining free travel $\Delta X_R$ until reaching the transition point $x_U$ and the subsequent establishment of force is traversed in a short time. At the same time, it can be guaranteed that there is a sufficiently large air gap between the brake linings 8, 8' and the brake disk 7 for example to reliably exclude inadvertent, unwanted drag on the brake linings 8, 8' on the brake disk 7 within the occurring temperature range.

The determination of the braking starting point $x_S$ is thus carried out starting from the transition point $x_U$ with a defined distance thereto in the releasing direction of the parking brake 13. Based on the determined transition point $x_U$, during a parking brake releasing process the spindle nut 4 of the parking brake 13 is moved by a further positioning distance $\Delta x_P$ towards the initial position $x_A$ until the braking starting point $x_S$ is reached. The spindle nut 4 remains in said position until a braking action by means of the parking brake 13 is demanded or the method is terminated. In the event of a demand for a braking force or clamping force F of the parking brake, the spindle nut 4 can be activated directly from the braking starting point $x_S$. In the event of a termination of the method, the spindle nut 4 can be moved directly from the braking starting point $x_S$ to the end position $x_E$ as necessary (when parking the vehicle) or to the initial position $x_A$ (in the case of normal further operation of the vehicle).

The invention claimed is:

1. A method for operating an automated parking brake for a motor vehicle with at least one brake device, comprising:
    transitioning the automated parking brake from a first state to a second state during an automated parking brake releasing process, wherein:
        in the second state no clamping force is established by the automated parking brake, and in the first state a clamping force is established by the automated parking brake; and
        a transition point defines the transition from the first state to the second state;
    identifying with a control unit of the motor vehicle the transition point during the automated parking brake releasing process;
    storing the identified transition point; and
    controlling the automated parking brake with the control unit based upon the stored transition point.

2. The method as claimed in claim 1, wherein the identifying with the control unit of the motor vehicle the transition point further comprises identifying with the control unit of the motor vehicle the transition point based on a time profile of a variable representing the clamping force of the automated parking brake.

3. The method as claimed in claim 1, further comprising:
    suspending with the control unit of the motor vehicle the identification of the transition point during a switch-on phase.

4. The method as claimed in claim 2, further comprising:
    determining with the control unit of the motor vehicle when the variable representing the clamping force of the automated parking brake lies below a defined threshold value,
    wherein the identifying with the control unit of the motor vehicle the transition point further comprises starting the identification of the transition point based on the determination.

5. The method as claimed in claim 2, further comprising:
    determining with the control unit of the motor vehicle when there is a continuous decline of the time profile of values of the variable representing the clamping force of the automated parking brake by identifying that four chronologically directly successive values in the time profile of values are successively decreasing,
    wherein the identifying with the control unit of the motor vehicle the transition point is based upon the determination.

6. The method as claimed in claim 2, further comprising:
  determining with the control unit of the motor vehicle when the time profile of values of the variable representing the clamping force of the automated parking brake changes,
  wherein the identifying with the control unit of the motor vehicle the transition point further comprises identifying the transition point based on the determination.

7. The method as claimed in claim 2, wherein the identifying with the control unit of the motor vehicle the transition point further comprises:
  identifying the transition point with the control unit of the motor vehicle based upon when a difference in a rate of decrease of three chronologically directly successive values of the time profile of values of the variable representing the clamping force of the parking brake successively decreases; and
  identifying the transition point with the control unit of the motor vehicle when three successive differences of chronologically immediately successive values are determined to each be smaller than a threshold value associated with the respective difference amounts, wherein the threshold values are equal or there is a reduction of the threshold values according to the chronological ranking of the associated difference amounts.

8. The method as claimed in claim 2, wherein the identifying with the control unit of the motor vehicle the transition point further comprises:
  evaluating with the control unit of the motor vehicle the time profile of the variable representing the clamping force of the automated parking brake during a force reduction phase.

9. The method as claimed in claim 2, wherein the identifying with the control unit of the motor vehicle the transition point further comprises:
  determining with the control unit of the motor vehicle a current value of a parking brake actuator, a voltage of a parking brake actuator, and/or a motor angular rate of a parking brake actuator.

10. The method as claimed in claim 1, wherein the identified transition point is taken into account during the operation of the automated parking brake as a reference value.

11. The method as claimed in claim 10, further comprising:
  carrying out the following while taking into account the identified transition point:
    positioning the automated parking brake;
    positioning the automated parking brake directly from a force reduction phase;
    positioning the automated parking brake directly from an end point of the automated parking brake;
    positioning the automated parking brake in a free travel phase; and/or
    positioning the automated parking brake at a braking starting point, wherein a reduced free travel of the automated parking brake is set, and wherein the reduced free travel is reduced compared to a usual free travel.

12. A brake device for a motor vehicle, comprising:
  an automated parking brake configured to transition from a first state to a second state during an automated brake releasing process; and
  a control unit operably connected to the automated parking brake, the control unit configured to transition the automated parking brake between the first and second states,
  wherein in the second state no clamping force is established by the automated parking brake, and in the first state a clamping force is established by the automated parking brake,
  wherein a transition point defines the transition from the first state to the second state,
  wherein the automated parking brake includes an identification unit configured to identify the transition point during the automated parking brake releasing process,
  wherein the control unit stores the identified transition point, and
  wherein the control unit controls the automated parking brake based upon the stored transition point.

* * * * *